C. L. TOLLES.
TRACTOR BELT.
APPLICATION FILED DEC. 6, 1913.

1,135,560.

Patented Apr. 13, 1915.
2 SHEETS—SHEET 1.

WITNESSES

INVENTOR
CHARLES L. TOLLES
BY
Paul & Paul
ATTORNEYS

C. L. TOLLES.
TRACTOR BELT.
APPLICATION FILED DEC. 6, 1913.

1,135,560.

Patented Apr. 13, 1915.
2 SHEETS—SHEET 2.

WITNESSES
M. R. M⸺
G. E. Sorensen

INVENTOR
CHARLES L. TOLLES
BY Paul & Paul
ATTORNEYS

UNITED STATES PATENT OFFICE.

CHARLES LYMAN TOLLES, OF EAU CLAIRE, WISCONSIN.

TRACTOR-BELT.

1,135,560.     Specification of Letters Patent.     Patented Apr. 13, 1915.

Application filed December 6, 1913. Serial No. 805,150.

*To all whom it may concern:*

Be it known that I, CHARLES L. TOLLES, citizen of the United States, resident of Eau Claire, county of Eau Claire, State of Wisconsin, have invented certain new and useful Improvements in Tractor-Belts, of which the following is a specification.

My invention relates to belts for use in connection with traction machines and the object of the invention is to provide a connecting means between the links of the belt which will allow the links to turn freely upon one another and exclude dust and dirt from the bearings between the links.

The invention consists generally in various constructions and combinations, all as hereinafter described and particularly pointed out in the claims.

Figure 1:
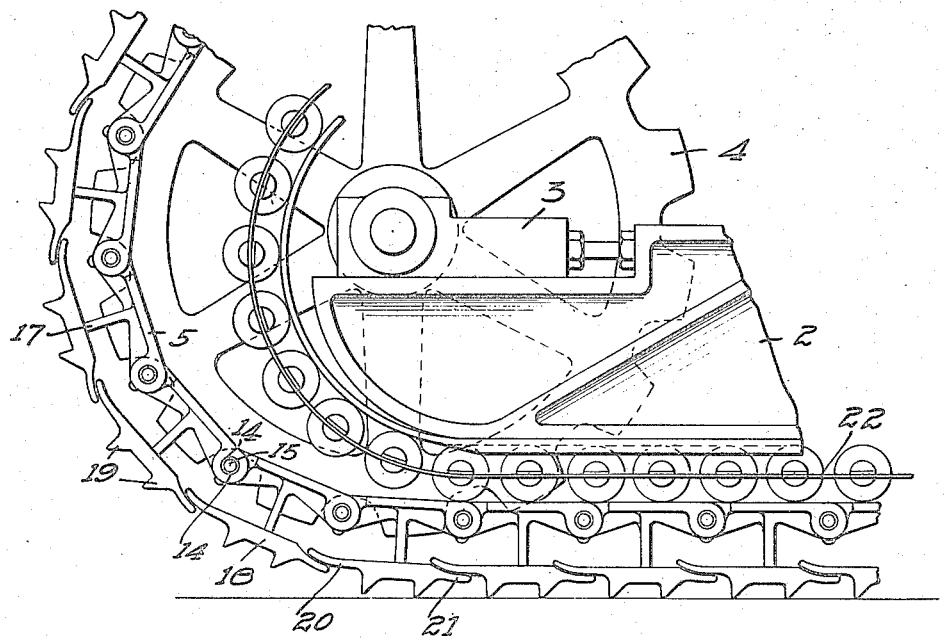
Figure 2:
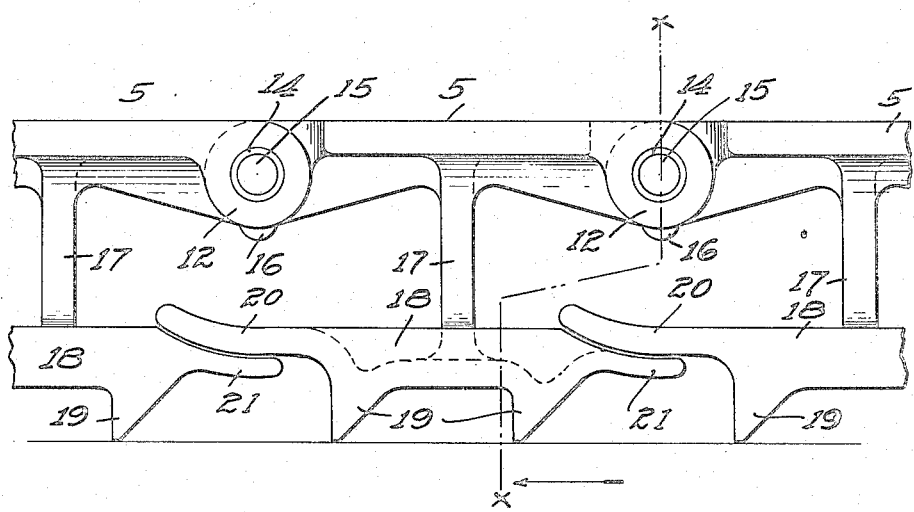
Figure 3:
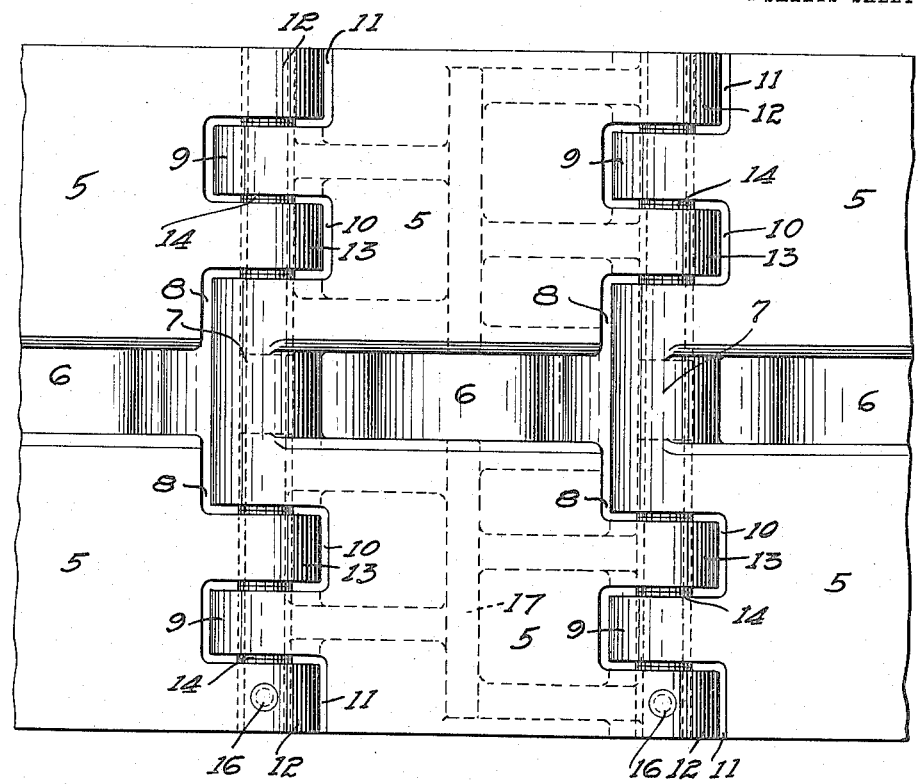
Figure 4:
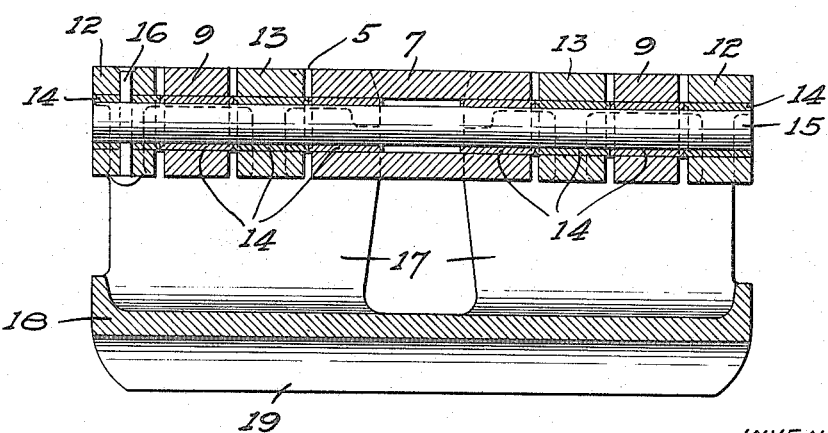

In the accompanying drawings forming part of this specification, Figure 1 is a side elevation of a portion of a traction machine, and its belt, with my invention applied thereto. Fig. 2 is a detail view of a section of the belt, showing the preferred construction of the traction shoes therefor, Fig. 3 is a plan view of a section of the belt, Fig. 4 is a sectional view on the line $x$—$x$ of Fig. 2.

In the drawing, 2 represents a portion of the frame of the machine, having a bearing 3 for a sprocket wheel 4. The traction belt for this machine consists of a series of links composed of plates 5, substantially flattened in form and provided with a centrally arranged recess or opening 6 to receive the teeth of the sprocket wheel, and a hub 7 at each end of said recess. These hubs extend across one end portion of each plate and each hub is adapted to fit into a recess 8 provided in the end of the adjacent link. On each side of the hub 7 at one end of the link I provide hubs 9 between which and the hub 7 recesses 10 are formed, and similar recesses 11 are provided between the hubs 9 and the outer edges of the links. The opposite end of each link from the hub 7 is provided with hubs 12 and 13 arranged in pairs on opposite sides of the sprocket tooth opening and these hubs, when the links are assembled, are adapted to enter the recesses 10 and 11 and have openings therethrough to coincide with the openings in the hubs 7 and 9. Into these openings a series of bushings 14 are inserted, one into each end of the hub 7 and one into each of the hubs on opposite sides of the hub 7, the bushings fitting snugly within said hubs and having their end surfaces machined to form a close, dust-proof joint between them. A pin 15 is then inserted into the bushings and is secured at one end to one of the outer hubs of each link by means of a pin 16. This construction locks the pin 15 against rotation with respect to the link to which it is secured, but allows it to turn in the bushings of the other link and also allows the hubs of the other link to turn on the pin 15. The ends of the pin 15 fit snugly within the bushings and entrance of dust and dirt therein will be prevented and the abutting ends of the bushings bear closely against one another and exclude any dust and dirt from entering therein, thereby forming a practically dust-proof bearing. Each link is preferably provided on the underside thereof with a transverse web 17 formed integrally with the link and depending therefrom and provided with an integral shoe 18 having traction teeth 19 which are adapted to dig into the soil. The forward end 20 of each shoe is arranged to lap over the rear end 21 of the adjacent shoe so that in turning around the traction wheel the shoes will remain in contact with one another and prevent refuse material from being gathered up and carried around with the belt. The overlapping ends 20 and 21 of the adjacent shoes have their overlapping surfaces curved on the arc of a circle whose center is coincident with the axis of the hinge between the two adjacent links, thereby permitting these surfaces to slide one upon the other without becoming separated while the shoes are passing around the sprocket wheels. An antifriction belt 22 is also preferably provided between the traction belt and the machine frame.

I do not limit myself to the details of the construction herein shown and described as the same may be varied in many particulars without departing from my invention.

I claim as my invention:

1. A tractor belt composed of a series of links, each having a central opening to receive the teeth of a sprocket wheel, and a transverse, centrally arranged hub at the end of said opening, said links also having alternating recesses and hubs upon opposite sides of said central hub, the recesses of one link being adapted to receive the opposite hubs of the adjacent link, a series of bushings fitting within said hubs and having abutting end surfaces forming dust-proof joints between said hubs, and pins fitting within said bushings, means for securing said pins to a hub of each link, and traction shoes mounted on said links.

2. A tractor belt comprising a series of links, each having a central opening therein to receive the teeth of a sprocket wheel and a central hub at the end of said openings extending transversely of said link, each link having at one end a hub upon opposite side of said central hub and at the opposite end a pair of recesses on each side of the central hub to receive a pair of hubs of the adjacent link, a series of bushings fitting end to end within openings in said hubs and having their abutting ends bearing upon one another and forming a dust-proof joint, and pins fitting within said bushings and secured at one end to a hub of a link and rotating with said hub and its link in the other bushings, and traction shoes carried by said links.

3. A tractor belt composed of a series of links, and having a central longitudinal opening, to receive the teeth of a sprocket wheel, a series of hubs at each end of each link and a series of recesses between said hubs, pins passing through openings in said hubs and hinging said links together, each link being also provided upon its under surface with a transverse web extending outwardly at right angles substantially to the plane of the links and terminating in an elongated shoe which lies in a plane parallel, substantially, with the plane of the link.

4. A tractor belt composed of links each having a transverse web extending outwardly at right angles substantially to the plane of the link and terminating in an elongated shoe which lies in a plane parallel, substantially, with the plane of the link, each link being provided also at each end with a series of hubs having transverse openings with recesses between said hubs, the position of the hubs at one end corresponding with the position of the recesses at the other end whereby the hubs upon the link extend into the recesses in the adjacent link, and transverse pins extending through said hubs forming therewith hinged connections between said links.

5. A tractor belt composed of links having their ends connected by a hinged joint and each link having a transverse web extending outwardly at right angles substantially to the plane of the link and terminating in an elongated shoe which lies in a plane parallel substantially with the plane of the link, the adjacent ends of the shoes overlapping and formed on the arc of a circle whose center coincides with the axis of the hinge between two adjacent links.

6. A tractor belt composed of a series of links, each comprising a supporting plate having a substantially flat upper face, a transverse web midway between its ends, said web extending outward substantially at right angles to said flat face of the plate, and an elongated shoe formed integral with said web and lying parallel therewith, the adjacent ends of said plates having interengaging parts, and means for connecting the same, whereby the plates may swing about said connection as a pivot.

In witness whereof, I have hereunto set my hand this 28 day of November 1913.

CHARLES LYMAN TOLLES.

Witnesses:
    CHARLES F. COFFIN,
    ROBT. B. BRIGGS.